(12) United States Patent
Asaoka (10) Patent No.: US 10,549,466 B2
(45) Date of Patent: Feb. 4, 2020

(54) INJECTION MOLDING SYSTEM

(71) Applicant: FANUC CORPORATION, Yamanashi (JP)

(72) Inventor: Hiroyasu Asaoka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 146 days.

(21) Appl. No.: 15/299,465

(22) Filed: Oct. 21, 2016

(65) Prior Publication Data

US 2017/0113390 A1    Apr. 27, 2017

(30) Foreign Application Priority Data

Oct. 23, 2015    (JP) .................................. 2015-209203

(51) Int. Cl.
| | | |
|---|---|---|
| *B29C 45/80* | (2006.01) | |
| *B29C 45/17* | (2006.01) | |
| *B29C 45/26* | (2006.01) | |
| *B25J 9/16* | (2006.01) | |

(Continued)

(52) U.S. Cl.
CPC ............ *B29C 45/80* (2013.01); *B29C 45/176* (2013.01); *B29C 45/1742* (2013.01); *B29C 45/1756* (2013.01); *B29C 45/26* (2013.01); *B25J 9/1697* (2013.01); *B25J 15/04* (2013.01); *B29C 45/03* (2013.01); *B29C 2045/1784* (2013.01); *B29C 2945/76083* (2013.01); *B29C 2945/76568* (2013.01)

(58) Field of Classification Search
CPC ... B29C 45/80; B29C 45/1756; B29C 45/176; B29C 45/03; B29C 45/1742; B29C 45/26; B25J 9/1697; B25J 15/04
See application file for complete search history.

(56) References Cited

U.S. PATENT DOCUMENTS

| | | | | |
|---|---|---|---|---|
| 4,610,075 A | * | 9/1986 | Eriksson | .................. B25J 15/04 |
| | | | | 279/4.06 |
| 2001/0054223 A1 | | 12/2001 | Yamanashi et al. | |

(Continued)

FOREIGN PATENT DOCUMENTS

| | | |
|---|---|---|
| CN | 201376335 Y | 1/2010 |
| DE | 3637098 A1 | 5/1988 |

(Continued)

OTHER PUBLICATIONS

Office Action in JP Application No. 2015-209203, dated Sep. 19, 2017, 8 pp.

(Continued)

*Primary Examiner* — Michael Robinson
(74) *Attorney, Agent, or Firm* — Hauptman Ham, LLP (57) ABSTRACT

In an injection molding system, bolt position related information recognizing unit which recognizes an attachment position of a bolt for each attachment is provided. Based on the attachment position of the bolt, or the attachment position of the bolt and a phase of the bolt stored in the bolt position storage unit, bolt attaching and detaching unit attaches and detaches the bolt to and from the attachment. Thus, even if the position of the bolt varies in accordance with the attachment, it is possible to attach and detach the bolt by recognizing the attachment position of the bolt.

11 Claims, 5 Drawing Sheets

(51) Int. Cl.
    *B25J 15/04*          (2006.01)
    *B29C 45/03*         (2006.01)

(56) References Cited

U.S. PATENT DOCUMENTS

| | | | |
|---|---|---|---|
| 2005/0053687 A1* | 3/2005 | Pitscheneder | B29C 45/766 425/190 |
| 2010/0071187 A1* | 3/2010 | Weinmann | B29C 45/176 29/426.5 |
| 2015/0251314 A1* | 9/2015 | Nammoto | B25J 9/1612 700/259 |
| 2016/0158985 A1* | 6/2016 | Fitzpatrick | B29C 45/03 700/202 |

FOREIGN PATENT DOCUMENTS

| | | |
|---|---|---|
| EP | 1166955 A2 | 1/2002 |
| JP | 4-135805 A | 5/1992 |
| JP | 7-108426 A | 4/1995 |
| JP | 11-42519 A | 2/1999 |
| JP | 11-92768 A | 4/1999 |
| JP | 2002-11635 A | 1/2002 |
| JP | 2011-173243 A | 9/2011 |

OTHER PUBLICATIONS

Office Action in German Application No. 102016012631.0, dated Mar. 20, 2019, 13pp.
Office Action in CN Application No. 201610908746.1, dated Sep. 20, 2018, 12 pp.

\* cited by examiner

INJECTION MOLDING SYSTEM

RELATED APPLICATIONS

The present application claims priority to Japanese Patent Application Number 2015-209203 filed Oct. 23, 2015, the disclosure of which is hereby incorporated by reference herein in its entirety.

BACKGROUND OF THE INVENTION

1. Field of the Invention

The present invention relates to injection molding systems and, in particular, a structure for supporting maintenance of an injection molding machine in an injection molding system.

2. Description of the Related Art

In a general injection molding machine, bolts are used to fix components of a mold and the injection molding machine. Also, a mechanism is also used to hold the components by using an apparatus such as an oil hydraulic clamp or magnetic clamp in place of bolts.

When an oil hydraulic clamp is used, the position of the clamp is fixed. Therefore, a fixing position commonly used for a plurality of molds has to be provided. Moreover, when a magnetic clamp is used, it is required to attach a magnetic plate to a mold fixing disc of the injection molding machine. Thus, the thickness of the mold mountable on the machine has to be decreased by the plate thickness of the magnetic plate, or the length of a nozzle has to be increased by the plate thickness of the magnetic plate in order to bring the nozzle of the injection molding machine into contact with the mold. Furthermore, for the oil hydraulic clamp, an expensive apparatus such as a magnetic clamp has to be introduced.

Thus, for production by replacing various molds, fastening with bolts is generally used. Fastening with bolts allows a mold to be easily fixed, and is highly flexible as well as at low cost at the time of introduction. In fastening with bolts, the position and length of a bolt for fixing a mold vary for each mold, and therefore mold replacement is generally performed by hand.

As with mold replacement, the mount positions and required number of, for example, ejector rods, which transfer ejecting motive power to the mold in the injection molding machine, also depend on the structure of the mold. Therefore, the positions and number thereof may vary in accordance with the mold.

Also, as for maintenance of a portion around a nozzle of an injecting apparatus of the injection molding machine, the sizes and positions of bolts for use vary depending on the component type. Therefore, automated attaching and detaching operation is difficult, and dissembling and assembling at the time of maintenance are required to be performed by hand.

It is generally performed that mold replacing operation is automated by combining an oil hydraulic clamp, a magnetic clamp, and mold conveying unit. However, for example, operation of fastening a bolt of a mold or the like is generally performed by humans.

As a method of fixing a mold to a platen, Japanese Patent Application Laid-Open No. 4-135805 discloses a technology of attaching a mold by using a robot including a bolt fastening tool at a wrist. As for bolt attachment and detachment, for example, as is used in, for example, assembling factories for automobiles and so forth, a motor-operated or air-driven impact wrench or the like is attached to a robot to remove a bolt.

Unlike the assembling factories for automobiles and so forth where the same things are assembled, the position of a bolt is changed for each mold in mold replacing operation. While the technology of Japanese Patent Application Laid-Open No. 4-135805 discloses bolt fastening by a robot, the technology does not disclose bolt position recognizing unit or bolt position storage unit. Thus, it may be difficult to address the case in which the position of a bolt is changed for each mold.

Moreover, since maintenance operation is not always being performed but is temporary, installing a machine dedicated to maintenance operation is not effective in view of space, and is also inefficient in operation.

SUMMARY OF THE INVENTION

Thus, an object of the present invention is to provide an injection molding system for an injection molding machine capable of automatically attaching and detaching a bolt.

An injection molding system according to the present invention includes an injection molding machine, bolt attaching and detaching unit which attaches and detaches a bolt regarding fixing of an attachment of the injection molding machine, a conveying apparatus which conveys the bolt attaching and detaching unit, bolt position related information recognizing unit which recognizes an attachment position of the bolt for each attachment, and bolt position storage unit which stores the attachment position of the bolt recognized by the bolt position related information recognizing unit, or the attachment position of the bolt and a phase of the bolt. The bolt attaching and detaching unit attaches and detaches the bolt to and from the attachment based on the attachment position of the bolt, or the attachment position of the bolt and the phase of the bolt stored in the bolt position storage unit.

In the injection molding system, the bolt position related information recognizing unit recognizes the attachment position of the bolt, and attaches and detaches the bolt to and from the attachment based on the attachment position. Therefore, even if the position of the bolt is variously changed in accordance with the attachment, the bolt can be attached and detached by recognizing the attachment position of the bolt.

As the bolt position related information recognizing unit, at least one of the following can be used: direct recognizing unit which recognizes information about the attachment position of the bolt, or the attachment position of the bolt and the phase of the bolt based on at least one of image information of the bolt taken by image-taking unit, operation information of driving unit which drives the conveying apparatus, and position information about the attachment position of the bolt measured by a measuring instrument, and indirect recognizing unit which recognizes the attachment position of the bolt from a drawing regarding the attachment.

As described above, in the injection molding system according to the present invention, the position of the bolt can be recognized by using, as bolt position related information recognizing unit, at least one of the direct recognizing unit which directly recognizes a position and so forth and the indirect recognizing unit which recognizes a position and so forth by calculation from a drawing and so forth.

The attachment is at least any one of a mold, an ejector rod, an insulation board, a nozzle, a cylinder head, and a heating cylinder.

In the injection molding system according to the present invention, the conveying apparatus can convey also molded-article holding unit for holding a molded article, and the bolt attaching and detaching unit and the molded-article holding unit may be replaceable with each other.

As described above, in the injection molding system according to the present invention, the conveying apparatus can convey also the molded-article holding unit, and the bolt attaching and detaching unit and the molded-article holding unit are replaceable with each other. Thus, with one conveying apparatus, it is possible to support both of extraction of a molded article and maintenance operation of the injection molding machine.

As the conveying apparatus, an articulated robot may be used. By using an articulated robot as the conveying apparatus, with rotation of a mount of the robot or the like, a range a tip can reach can be widened.

Also, in the injection molding system according to the present invention, bolt fastening operation for the bolt may be divided into a predetermined number of times, and fastening may be performed with a torque smaller than a specified torque set in advance at a first time, may be performed with a larger torque in sequence at a second time onward, and may eventually be performed with the specified torque set in advance.

In the injection molding system according to the present invention, fastening is performed with a torque smaller than the specified torque set in advance at a first time and, with the torque being sequentially increased, fastening is eventually performed with the specified torque. Thus, the bolt can be fastened in a well-balanced manner as a whole.

In the injection molding system according to the present invention, the bolt attaching and detaching unit and the molded-article holding unit may be automatically replaceable with each other. For this, the injection molding system according to the present invention has a replacing apparatus which can automatically replace the bolt attaching and detaching unit and the molded-article holding unit with each other.

In the injection molding system according to the present invention, by using the replacing apparatus or the like, the bolt attaching and detaching unit and the molded-article holding unit are automatically replaceable with each other. With this, it is possible to replace the bolt attaching and detaching unit and the molded-article holding unit with each other without any manual control.

In the injection molding system according to the present invention, a nut runner may be used as the bolt attaching and detaching unit. By using a nut runner as the bolt attaching and detaching unit, operation time can be reduced.

In the injection molding system according to the present invention, a specified torque for fastening the mold may be stored in a mold file which stores a molding condition of the mold, and the bolt attaching and detaching unit may attach and detach the bolt based on the attachment position of the bolt stored in the bolt position storage unit and the specified torque stored in the mold file.

By using the mold file, it is possible to simultaneously adjust both of replacement of a mold or the like and change of a molding condition. Also, even if a mold is relocated to another injection molding machine, the same mold file can be used. Therefore, relocation can be easily performed, and management can be effectively performed.

In the injection molding system according to the present invention, a dedicated key for activating the bolt attaching and detaching unit may be placed on an operation screen or an operation panel of the injection molding machine. In this manner, with the dedicated key for activating the bolt attaching and detaching unit placed on the operation screen or the operation panel of the injection molding machine, a separate display or the like is not required to be provided, and the injection molding system can be configured as being inexpensive and compact. Also, since the state of the bolt attaching and detaching unit can be grasped on the screen of the injection molding machine, safety of the injection molding system can be enhanced, and operation can also be facilitated.

As described above, the present invention can provide an injection molding system for an injection molding machine capable of automatically attaching or detaching a bolt.

BRIEF DESCRIPTION OF THE DRAWINGS

These and other objects and features of the present invention will become apparent from the following description of exemplary embodiments with reference to the accompanying drawings in which.

DETAILED DESCRIPTION OF THE PREFERRED EMBODIMENTS

First Embodiment

Figure 1:
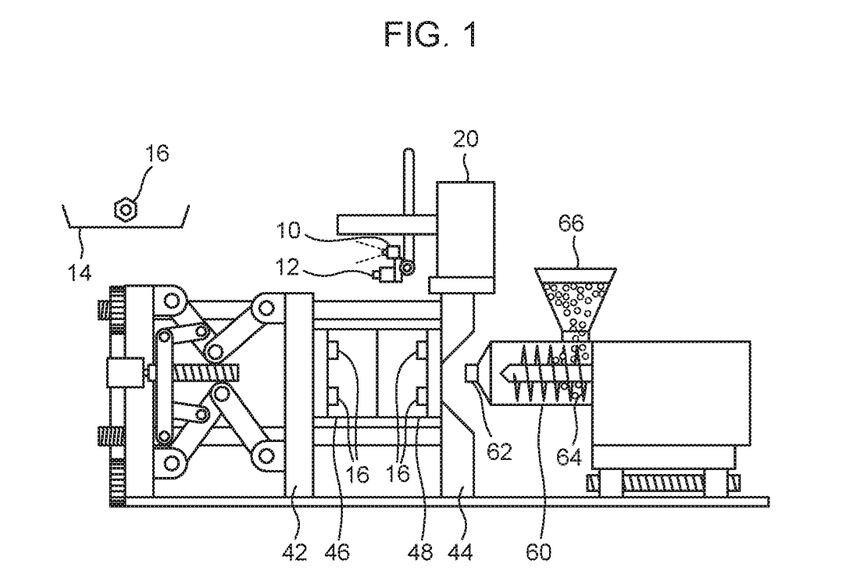
FIG. 1 is a schematic diagram for describing a first embodiment of the present invention.

FIG. 1 is a schematic diagram for describing a first embodiment of the present invention. An injection molding machine includes a movable platen 42 and a fixed platen 44. To the movable platen 42, a movable-side mold 46 is fixed with bolts 16. To the fixed platen 44, a fixed-side mold 48 is fixed with bolts 16. An injecting apparatus is configured mainly of an injection cylinder 60 and a hopper 66 which supplies resin to the injection cylinder 60. At a tip of the injection cylinder 60, a nozzle 62 is provided. Inside the injection cylinder 60, a screw 64 is provided.

In the above-configured injection molding machine, the resin in the hopper 66 is supplied to the inside of the injection cylinder 60, and is then agitated and conveyed by the screw 64 while being heated by a heater not depicted. The resin melt by heat is injected from the tip of the nozzle 62 pressed in contact with the fixed-side mold 48 into the inside of the mold.

After the resin is injected into the inside of the mold, the movable platen 42 is driven for mold closing and mold clamping of the movable-side mold 46 and the fixed-side mold 48, thereby molding a molded article inside the mold. Then, by ejecting an ejector rod 56, the molded article is ejected outside the mold.

Onto the fixed platen 44, an orthoaxis-type conveying apparatus 20 is attached. The conveying apparatus 20 has an instrument capable of operating in a predetermined range in vertical and lateral directions in FIG. 1 and in a direction perpendicular to the sheet of FIG. 1. At the instrument of the conveying apparatus 20, a camera 10 and a motor-operated rotatable wrench 12 are attached. The wrench 12 has a size corresponding to the bolt 16 to be attached and detached. Also, the bolt 16 to be attached and the detached bolt 16 are placed on a bolt tray 14.

By the camera 10, an image of the attachment position of the bolt 16 is taken. Based on the image-taking result, the position of the bolt 16 to be detached is stored in storage unit, not depicted, of the conveying apparatus 20. After moving the instrument to a region near the bolt 16 to be detached, the conveying apparatus 20 recognizes, by the camera 10, the state of the bolt 16 required for detachment, such as the position of the bolt 16 and the phase of the bolt head.

Figure 2:
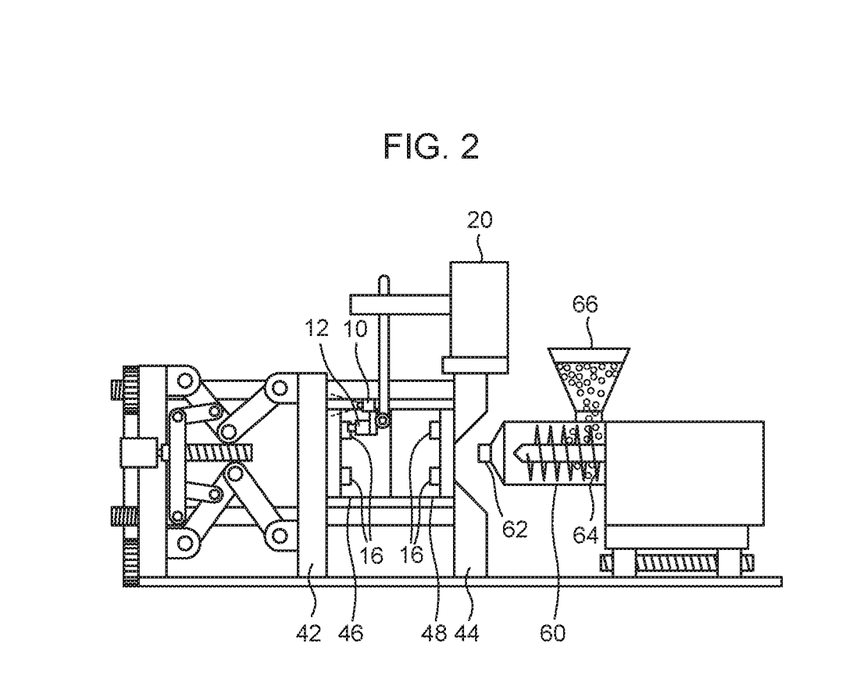
FIG. 2 is a diagram depicting the state in which a bolt is being detached by a wrench.

The phase of the bolt head in the present embodiment indicates an orientation of a rotating direction in a hole into which, for example, a hexagon head bolt is to be inserted by a wrench, and represents a numerical value for use in adjusting the insertion angle of the wrench 12 into the bolt 16. After the state of the bolt 16 is recognized, the position of the bolt 16 and the state of a tool are corrected as required, and then the wrench 12 is brought into contact with the bolt 16. Then, the bolt 16 is detached by the wrench 12. FIG. 2 is a diagram depicting the state in which the bolt 16 is being detached by the wrench 12. When the bolt 16 is detached, the bolt 16 can be completely detached by the wrench 12 or can be loosened, without being completely detached, to a state so as to be loosened by hand.

In the case of attachment, as with the case of detachment, the bolt 16 is attached by recognizing the position of the bolt hole. Also at the time of attaching the bolt 16, the bolt 16 may be completely fastened by the wrench 12 or may be fastened to some degree and then eventually fastened by hand. To completely fasten the bolt 16, an attachment tool with large output is required. If fastening is performed merely to some degree, an attachment tool with small output suffices. Even if the bolt 16 is eventually fastened by hand, the load on an operator can be significantly reduced.

Figure 3:
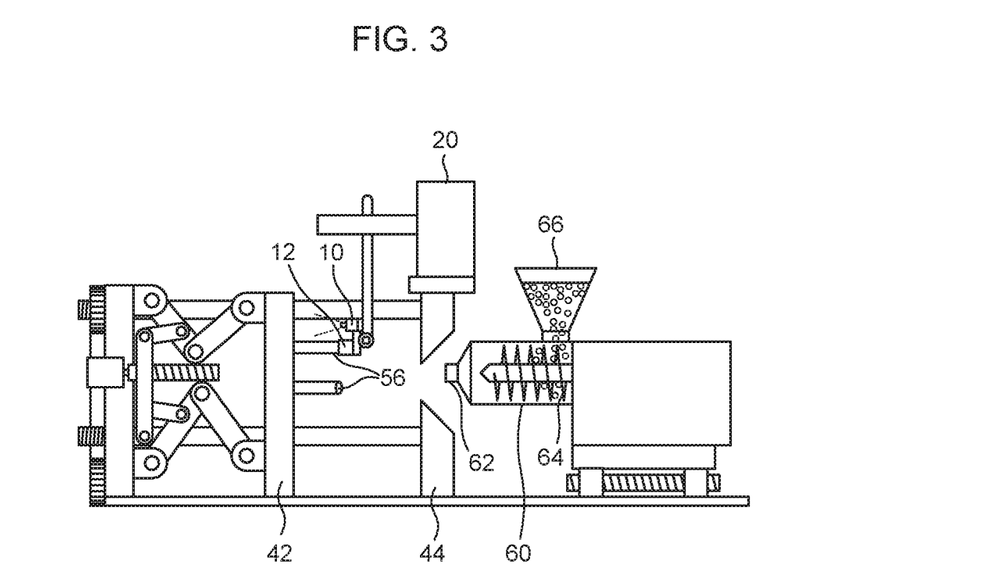
FIG. 3 is a diagram depicting the state of attaching an ejector rod.

FIG. 3 is a diagram depicting an example in which an ejector rod 56 is attached or detached in place of a bolt for fixing a mold. As depicted in FIG. 3, to the movable platen 42 with a mold not attached thereto, the ejector rod 56 for ejecting a molded article after molding is attached. Also when the ejector rod 56 is attached, the ejector rod 56 is ejected by a predetermined amount so as to be easily operated, and then attachment and detachment can be performed by using a method similar to that for bolt fastening.

Other than the bolt 16 and the ejector rod 56, the method can be applied also to fix an insulation board of the injection molding machine, the injection cylinder 60, and the head of the injection cylinder 60 and the nozzle 62 at the tip thereof.

Furthermore, while the camera 10 is used as unit which recognizes the attachment position of the bolt 16 in the present embodiment, this is not meant to be restrictive. For example, a sensor using infrared rays, ultrasonic waves, or the like can be used in place of the camera 10 to recognize the attachment position of the bolt 16.

Furthermore, as another method, position information of the instrument of the conveying apparatus 20 is grasped based on operation information of driving unit of the conveying apparatus 20, and the obtained position information and a power sensor or the like are combined together. With this, it is possible to grasp a state of the instrument of the conveying apparatus 20 in contact with the bolt 16. In this manner, with the position information of the instrument of the conveying apparatus 20 and the power sensor in place of the camera 10, it is possible to recognize information about the bolt and the attachment position of the bolt.

As still another method, the position of the bolt 16 may be directly measured by using a measuring instrument. In this case, efficiency is enhanced if the measuring instrument for use is a non-contact device, in view of operability.

Information about these bolts and attachment positions of the bolts may be used by using any of the examples described above, or may be used in combination of a plurality of unit. Appropriate one or more of these can be selected in accordance with the size of the system and the target to be replaced.

Furthermore, if the instrument of the conveying apparatus 20 can be oriented to a fixed-side mold 48 side by, for example, allowing the instrument of the conveying apparatus 20 to be oriented to an opposite side, it is possible to attach and detach a bolt for fixing the fixed-side mold 48, a bolt with which a component configuring the fixed-side mold 48 is fixed, and a bolt with which a component configuring the injection cylinder 60 is fixed, by using unit similar to those described above.

Since the conveying apparatus 20 is normally attached to an upper surface of the fixed platen 44 of the injection molding apparatus, positional accuracy with respect to the fixed platen 44 can be easily achieved. On the other hand, the injection cylinder 60 tends to have backlash and positional deviation with respect to the fixed platen 44. Therefore, it is effective to recognize and correct a bolt and an attachment position of the bolt by using the camera 10 and so forth.

Also, in the present embodiment, as unit of recognizing a bolt and an attachment position of the bolt, the camera 10 is used for recognition based on the image-taking result by the camera 10. Alternatively, a drawing regarding attachments such as bolts may be stored in storage unit or the like of the injection molding machine and, based on the drawing information, a bolt and an attachment position of the bolt may be recognized. In this case, there is an advantage of dispensing with the camera 10 as recognizing unit.

Second Embodiment

Figure 4:
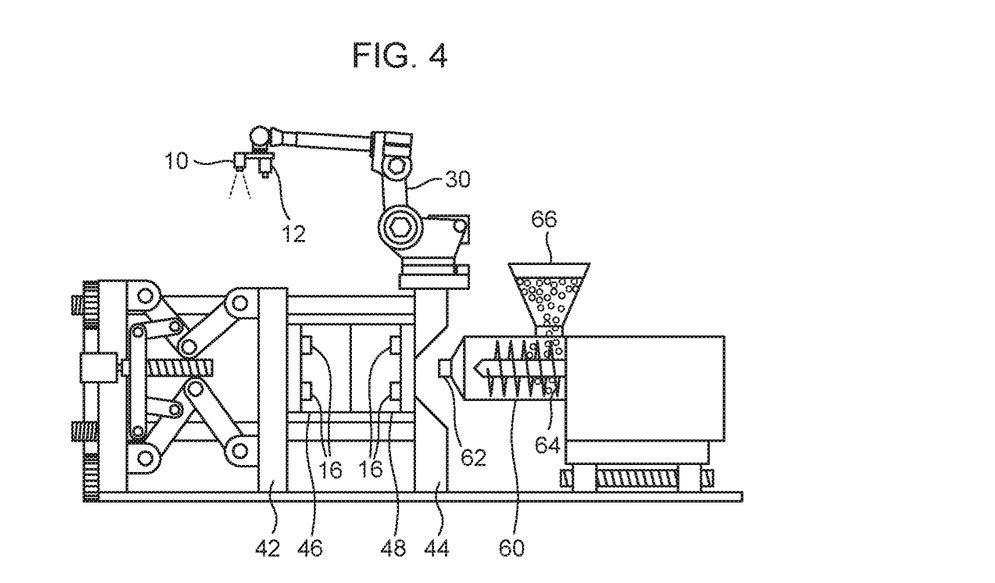
FIG. 4 is a schematic diagram for describing a second embodiment of the present invention.

FIG. 4 is a diagram depicting a second embodiment of the present invention. The present embodiment is different from the first embodiment in that the conveying apparatus 20 is replaced by an articulated robot 30. Also in the present embodiment, the camera 10 and the wrench 12 are attached to a tip of an articulated robot 30 to allow a bolt to be attached or detached in a manner similar to that of the first embodiment.

In the first embodiment, since the orthoaxis-type conveying apparatus 20 is used, if the conveying apparatus 20 is attached to the upper surface of the fixed platen 44 of the injection molding apparatus, it may be difficult, in view of the structure of the conveying apparatus 20, to move the instrument to both the side of the movable-side mold 46 and the fixed-side mold 48 and the side of the injection cylinder 60.

Figure 5:
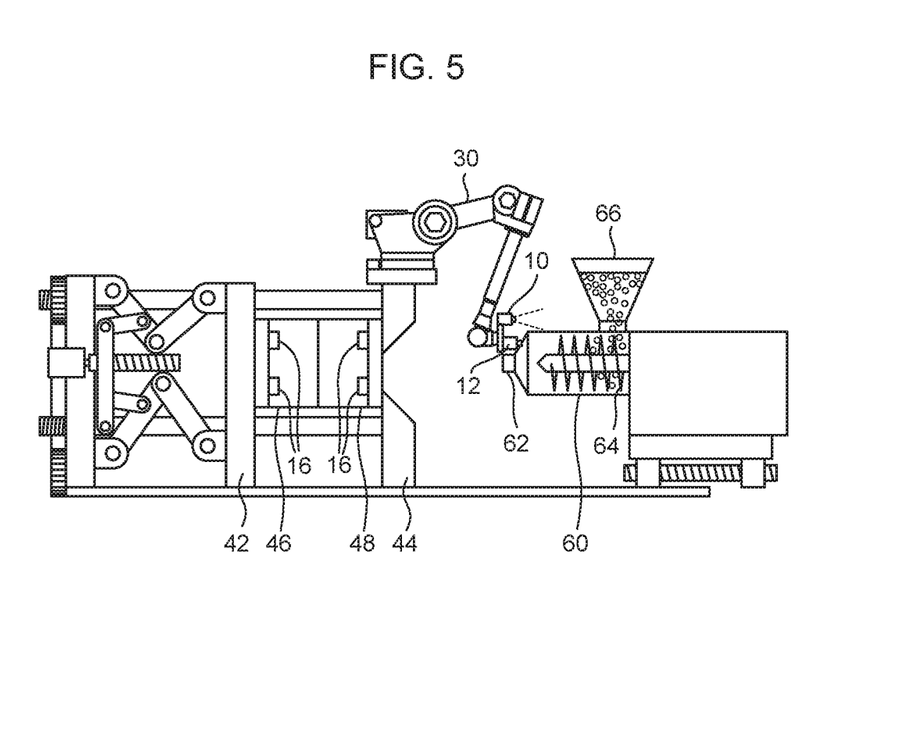
FIG. 5 is a diagram depicting the state in which the orientation of an articulated robot is changed to attach or detach a nozzle fixing bolt of an injection cylinder.

On the other hand, when the articulated robot 30 is used as in the present embodiment, since a mount where the articulated robot 30 is attached can be rotated, a range the instrument of the articulated robot 30 can reach can be easily widened to the movable-side mold 46, the fixed-side mold 48, and the injection cylinder 60. FIG. 5 is a diagram depicting the state in which the orientation of the articulated robot 30 is changed to attach or detach a nozzle fixing bolt of the injection cylinder 60. The nozzle fixing bolt of the injection cylinder 60 can be attached and detached also by using a method similar to that when a mold bolt is attached and detached.

To a mold, a pipe for heating and cooling and an electric wire are attached. When the articulated robot 30 is used as in the present embodiment, the orientation at the time of making contact with a bolt is flexible, and therefore a contact with the bolt can be made, with the pipe or electric wire avoided.

In bolt fastening in the above-described embodiments, when a tool for fastening a bolt is controlled, bolt fastening operation is divided into a predetermined number of times, and fastening is performed with a torque smaller than a specified torque set in advance at a first time, is performed with a larger torque in sequence at a second time onward, and is eventually performed with the specified torque set in advance. With this, the bolt can be fastened in a well-balanced manner as a whole.

Thus, in particular, when a bolt with a large fastening torque is attached, "deviation", "galling", and so forth of a component, which may occur because one bolt is fastened at a dash, can be avoided.

Third Embodiment

Figure 6:
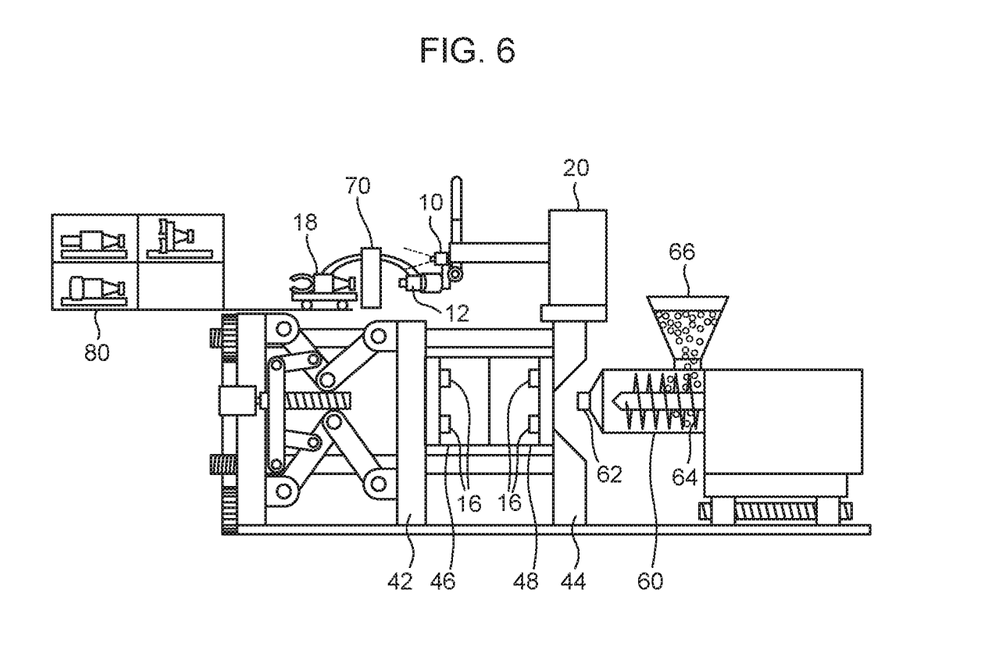
FIG. 6 is a diagram depicting a third embodiment of the present invention.

FIG. 6 is a diagram depicting a third embodiment of the present invention. The present embodiment is different from the above first and second embodiments in that components at the instrument of the conveying apparatus 20 are automatically replaceable.

In the present embodiment, a rack 80 is prepared near the conveying apparatus 20, and tools, an instrument 18 for holding a molded article, and the like are prepared. The conveying apparatus 20 selects a thing required for operation from the rack 80 to automatically replace the instrument by using a replacing apparatus 70. As a replaceable instrument attachment structure, as with the structure of a tool and a tool replacing apparatus for use in a machine tool, a structure can be used in which a hook shape provided at an instrument for replacement is held by using electricity, air pressure, oil pressure, or the like for attachment.

Replacement can be also performed by similar unit by using an automated warehouse in place of a rack. The bolts for use in attaching components of the injection molding machine such as a mold and an injection cylinder have various shapes and sizes. Therefore, it is effective that the instrument is automatically replaceable in accordance with the shape and size of a bolt.

Figure 7:
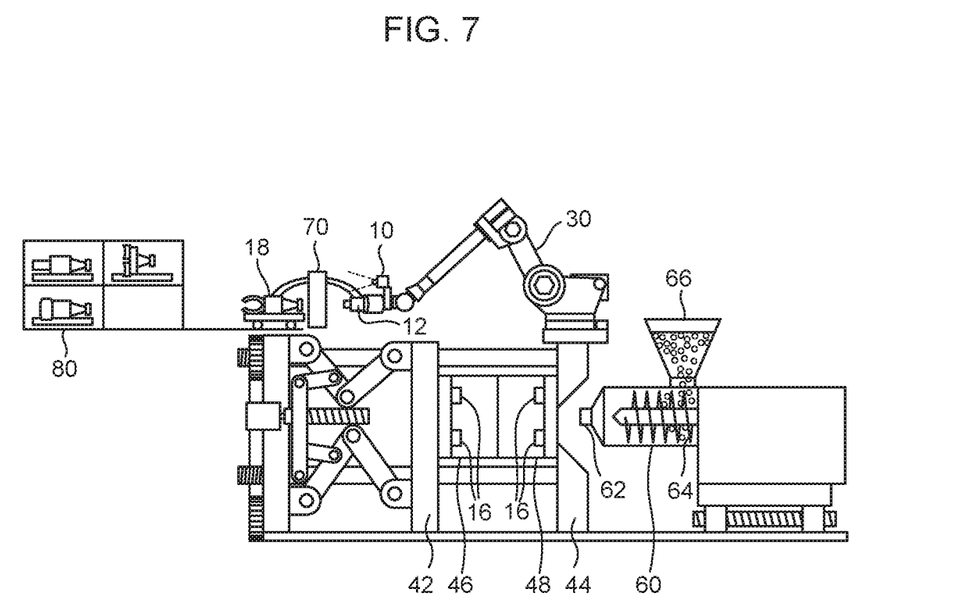
FIG. 7 is a diagram depicting a modification example of the third embodiment.

FIG. 7 is a diagram depicting a modification example of the embodiment depicted in FIG. 6 by replacing the conveying apparatus 20 with the articulated robot 30. Also when the articulated robot 30 is used, a component at an instrument can be automatically replaced in a similar manner.

As bolt attaching and detaching unit, a nut runner can be used. By using a nut runner, operation time can be reduced.

For mold attachment, attachment information at the time of attachment varies for each mold. Also, in a storage apparatus, not depicted, of the injection molding machine, a molding condition file is often stored for each mold.

Figure 8:
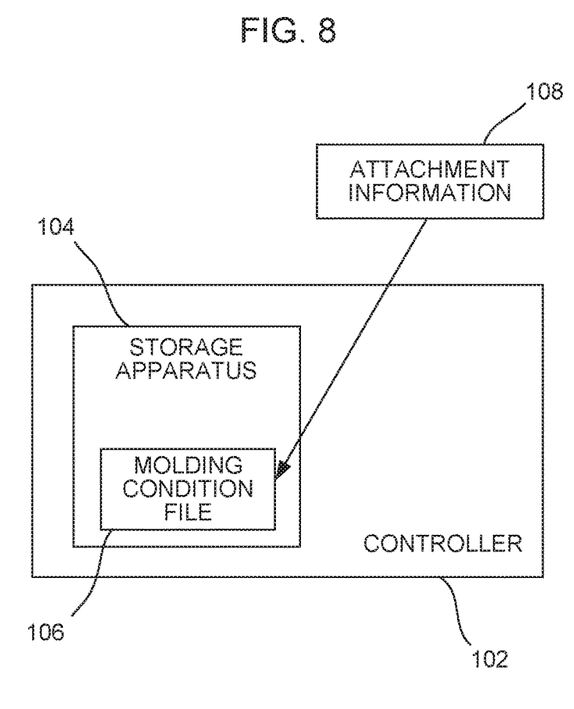
FIG. 8 is a diagram depicting the structure of a controller of an injection molding machine.

FIG. 8 is a diagram depicting the structure of a controller of an injection molding machine. In a storage apparatus 104 in a controller 102, a molding condition file 106 for each mold is stored. Here, in the molding condition file 106 for storing a molding condition, a fastening torque and so forth can be stored together with the molding condition as bolt attachment information 108 for attaching a mold. With this, by reading the molding condition file 106 including the attachment information 108 at the time of mold replacement, mold attaching operation can be performed.

In addition to the fastening torque, the bolt attachment position, the bolt size, and so forth can also be stored as the attachment information 108 for the bolt. With this structure, mold replacement and molding condition change can be managed in a unified manner. Also, even when a mold is transferred to another injection molding machine, the same molding condition file 106 can be used to use bolt fastening information.

Figure 9:
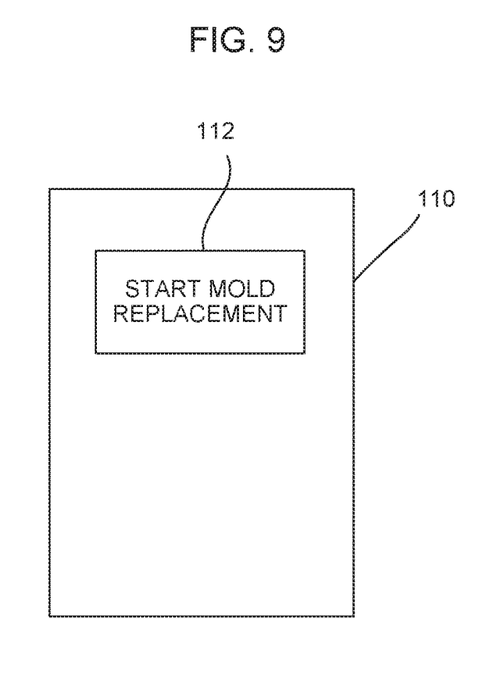
FIG. 9 is an operation screen of the injection molding machine.

As depicted in FIG. 9, an operation key 112 can be provided to an operation screen 110 or operation panel of the injection molding machine to activate mold replacing operation. With this structure, an instruction for activating operation of the injection molding machine and an instruction for performing mold replacing operation can be made in a unified manner. Furthermore, since it is not required to provide a separate display or the like to activate mold replacing operation, an inexpensive, compact molding system can be configured. Furthermore, since it is possible to grasp the state of the conveying apparatus 20 and the articulated robot 30 on the operation screen 110 or operation panel of the injection molding machine, the present embodiment is effective in safety and operability.

The invention claimed is:

1. An injection molding system, comprising:
   an injection molding machine;
   a bolt attaching and detaching unit configured to attach and detach a bolt for fixing of a plurality of different components to the injection molding machine at a different attachment position of the bolt relative to the injection molding machine depending on the component attached by the bolt to the injection molding machine;
   a conveying apparatus configured to convey the bolt attaching and detaching unit;
   a bolt position related information recognizing unit configured to recognize the attachment position of the bolt for each component of the plurality of different components;
   a memory configured to store
      the attachment position of the bolt recognized by the bolt position related information recognizing unit, or
      the attachment position of the bolt and a phase of the bolt recognized by the bolt position related information recognizing unit; and
   an instrument configured to hold a molded article, wherein
   the bolt attaching and detaching unit is configured to attach and detach the bolt to and from the component based on
      the attachment position of the bolt recognized by the bolt position related information recognizing unit and stored in the memory, or the attachment position of the bolt and the phase of the
bolt recognized by the bolt position related information recognizing unit and stored in the memory,
the conveying apparatus is configured to convey the instrument,
the bolt attaching and detaching unit and the instrument are replaceable with each other, and
the bolt position related information recognizing unit is at least either a direct recognizing unit or an indirect recognizing unit,
 the direct recognizing unit is configured to recognize either (1) information about the attachment position of the bolt, or (2) the attachment position of the bolt and the phase of the bolt, based on image information of the bolt taken by a camera, and
 the indirect recognizing unit is configured to recognize the attachment position of the bolt from drawing information stored in the memory regarding the plurality of different components,
the phase of the bolt
 indicates an orientation of a rotating direction in a hole into which a head of the bolt is to be inserted by a wrench of the bolt attaching and detaching unit, and
 represents a numerical value for use in adjusting an insertion angle of the wrench into the bolt,
when the bolt is detached,
 (1) a state of the bolt is recognized,
 (2) the position of the bolt and a state of a tool are corrected, and
 (3) the wrench is brought into contact with the bolt, and
when the bolt is fastened, fastening is performed
 with a first torque which is smaller than a specified torque set in advance, then
 with a second torque which is larger than the first torque, and then
 with a third torque which is the specified torque set in advance.

2. The injection molding system according to claim 1, wherein
the direct recognizing unit is configured to recognize (1) the information about the attachment position of the bolt, or (2) the attachment position of the bolt and the phase of the bolt, further based on at least one of
 operation information of a driving unit which drives the conveying apparatus, or
 position information about the attachment position of the bolt measured by a measuring instrument.

3. The injection molding system according to claim 1, wherein the plurality of different components includes at least any one of a mold, an ejector rod, an insulation board, a nozzle, a cylinder head, and a heating cylinder.

4. The injection molding system according to claim 1, wherein the conveying apparatus is an articulated robot.

5. The injection molding system according to claim 1, further comprising:
a controller configured to control the bolt attaching and detaching unit, wherein
when the plurality of different components are fixed to the injection molding machine, the controller is configured to control the bolt attaching and detaching unit to
 at a first time, fasten the bolt with the first torque smaller than the specified torque set in advance,
 at a second time after the first time, fasten the bolt with the second torque larger than the first torque but still smaller than the specified torque, and
 eventually fasten the bolt with the specified torque set in advance.

6. The injection molding system according to claim 1, wherein the bolt attaching and detaching unit and the instrument are automatically replaceable with each other.

7. The injection molding system according to claim 6, further comprising a replacing apparatus configured to automatically replace the bolt attaching and detaching unit and the instrument with each other.

8. The injection molding system according to claim 1, wherein the bolt attaching and detaching unit includes a nut runner.

9. The injection molding system according to claim 1, wherein
the specified torque is for fastening the mold and is stored in a mold file which stores a molding condition of the mold, and
the bolt attaching and detaching unit is configured to attach and detach the bolt based on the attachment position of the bolt stored in the memory and the specified torque stored in the mold file.

10. The injection molding system according to claim 1, wherein a dedicated key for activating the bolt attaching and detaching unit is placed on an operation screen or an operation panel of the injection molding machine.

11. An injection molding system, comprising:
an injection molding machine;
a wrench for attaching and detaching a bolt for fixing of a plurality of different components to the injection molding machine at a different attachment position of the bolt relative to the injection molding machine depending on the component attached by the bolt to the injection molding machine;
a conveying apparatus for conveying the wrench;
a controller configured to recognize the attachment position of the bolt for each component of the plurality of different components;
a memory configured to store
 the attachment position of the bolt recognized by the controller, or
 the attachment position of the bolt and a phase of the bolt recognized by the controller; and
an instrument for holding a molded article, wherein
the wrench is configured to attach and detach the bolt to and from the component based on
 the attachment position of the bolt recognized by the controller and stored in the memory, or
 the attachment position of the bolt and the phase of the bolt recognized by the controller and stored in the memory,
the conveying apparatus is configured to convey the instrument,
the wrench and the instrument are replaceable with each other, and
the controller is configured to perform at least one of
 directly recognizing either (1) information about the attachment position of the bolt, or (2) the attachment position of the bolt and the phase of the bolt, based on image information of the bolt taken by a camera, or
 indirectly recognizing the attachment position of the bolt from drawing information stored in the memory regarding the plurality of different components,
the phase of the bolt
 indicates an orientation of a rotating direction in a hole into which a head of the bolt is to be inserted by the wrench, and
 represents a numerical value for use in adjusting an insertion angle of the wrench into the bolt, when the bolt is detached,
- (1) a state of the bolt is recognized,
- (2) the position of the bolt and a state of a tool are corrected, and
- (3) the wrench is brought into contact with the bolt, and when the bolt is fastened, fastening is performed
- with a first torque which is smaller than a specified torque set in advance, then
- with a second torque which is larger than the first torque, and then
- with a third torque which is the specified torque set in advance.

\* \* \* \* \*